(12) United States Patent
Laue

(10) Patent No.: US 11,074,803 B1
(45) Date of Patent: Jul. 27, 2021

(54) SEPTIC TANK MAINTENANCE WARNING SYSTEM

(71) Applicant: Brandon Laue, Kenyon, MN (US)

(72) Inventor: Brandon Laue, Kenyon, MN (US)

(*) Notice: Subject to any disclaimer, the term of this patent is extended or adjusted under 35 U.S.C. 154(b) by 0 days.

(21) Appl. No.: 16/904,701

(22) Filed: Jun. 18, 2020

(51) Int. Cl.
G08B 21/24 (2006.01)
H04W 4/20 (2018.01)
G08B 7/06 (2006.01)

(52) U.S. Cl.
CPC .............. *G08B 21/24* (2013.01); *G08B 7/06* (2013.01); *H04W 4/20* (2013.01)

(58) Field of Classification Search
CPC ............ G08B 21/24; G08B 7/06; H04W 4/20
See application file for complete search history.

(56) References Cited

U.S. PATENT DOCUMENTS

| | | | |
|---|---|---|---|
| 4,348,278 A | 9/1982 | Caccia | |
| 4,715,966 A | 12/1987 | Bowman | |
| 5,441,632 A | 8/1995 | Charon | |
| 5,696,493 A | 12/1997 | Einck | |
| 5,898,375 A * | 4/1999 | Patterson | C02F 3/006 340/612 |
| 6,217,752 B1 | 4/2001 | Coots | |
| 6,879,935 B2 | 4/2005 | Keck | |
| 7,731,855 B2 | 6/2010 | Dunbar | |
| 9,786,152 B1 | 10/2017 | Walker | |
| 2011/0180161 A1* | 7/2011 | Boren | E03F 1/007 137/487.5 |
| 2013/0314235 A1 | 11/2013 | Rogers | |

* cited by examiner

*Primary Examiner* — Kabir A Timory

(57) ABSTRACT

A septic tank maintenance warning system includes a dwelling and a housing mounted in the dwelling. A processor is mounted in the housing and is programmed with a first time comprising a current date and time. The processor is programmed with a second time comprising a future date and time with respect to the first time. The second time defines an alarm time. The second time is resettable to a new second time only between 5.0 hours and 10.0 years forward of the first time when the second time is reset. An alarm is electrically coupled to the processor and is activated when the second time is attained. The alarm is turned on when the second time is attained. The alarm is turned off only when the processor receives a reset code.

20 Claims, 5 Drawing Sheets

US 11,074,803 B1

SEPTIC TANK MAINTENANCE WARNING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to maintenance alerting devices and more particularly pertains to a new maintenance alerting device for alerting an owner of a septic tank that the septic tank system is due for an inspection and/or maintenance.

(2) Description of Related Art Including Information Disclosed Under 37 CFR 1.97 and 1.98

The prior art relates to septic tank failure warning devices which are used to signal that a septic tank is no longer operating correctly due to build up within the septic tank or because of other mechanical failures. However, these systems tend to sound the alert after the damage of buildup has already occurred. This leads to costly and time-consuming repairs and could be prevented by routine inspections and maintenance. However, because maintenance is required very infrequently, such as approximately every three years, is are often forgotten and not properly undertaken as needed. The current invention ensures that the owner will regularly commit to septic tank inspections and maintenance to prevent future septic tank failures from occurring.

BRIEF SUMMARY OF THE INVENTION

An embodiment of the disclosure meets the needs presented above by generally comprising a dwelling and a housing mounted in the dwelling. A processor is mounted in the housing and is programmed with a first time corresponding to a current date and time. The processor is programmed with a second time, defining an alarm time, that is a future date and time with respect to the first time. The second time is resettable to a new second time only between 1.0 years and 10.0 years forward of the first time when the second time is reset. An alarm is electrically coupled to the processor and is activated when the second time is attained. The alarm includes a light emitter that is mounted on the housing and is electrically coupled to the processor. The light emitter emits light when the second time is attained and is turned off only when the processor receives a reset code.

In another embodiment, the invention of the present disclosure includes a dwelling and a housing mounted in the dwelling. A processor is mounted in the housing and is programmed with a first time comprising a current date and time. The processor is programmed with a second time comprising a future date and time with respect to the first time. The second time defines an alarm time. The second time is resettable to a new second time only between 5.0 hours and 10.0 years forward of the first time when the second time is reset. An alarm is electrically coupled to the processor and is activated when the second time is attained. The alarm is turned off only when the processor receives a reset code.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
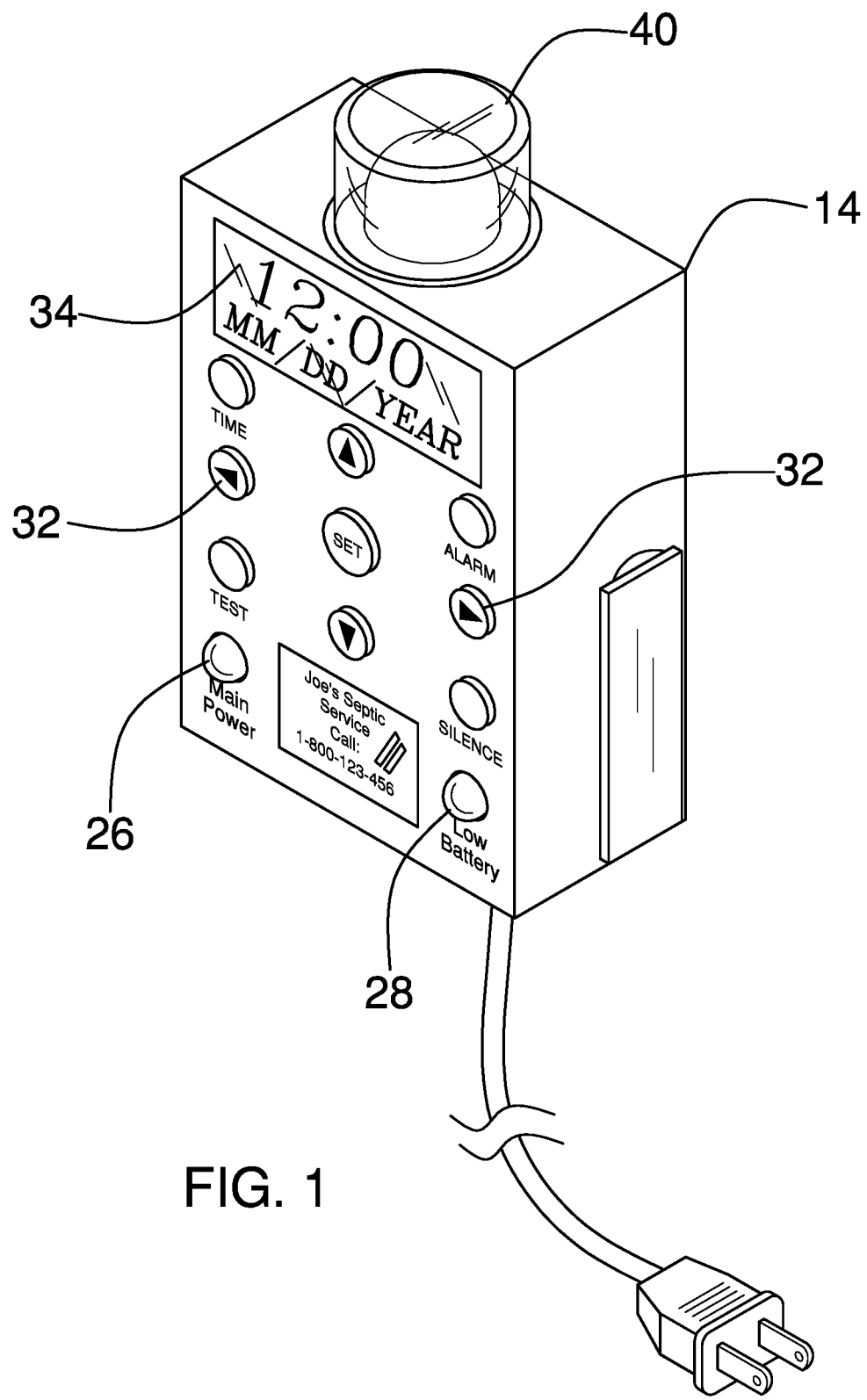
FIG. 1 is a front isometric view of a housing of a septic tank maintenance warning system according to an embodiment of the disclosure.
Figure 2:
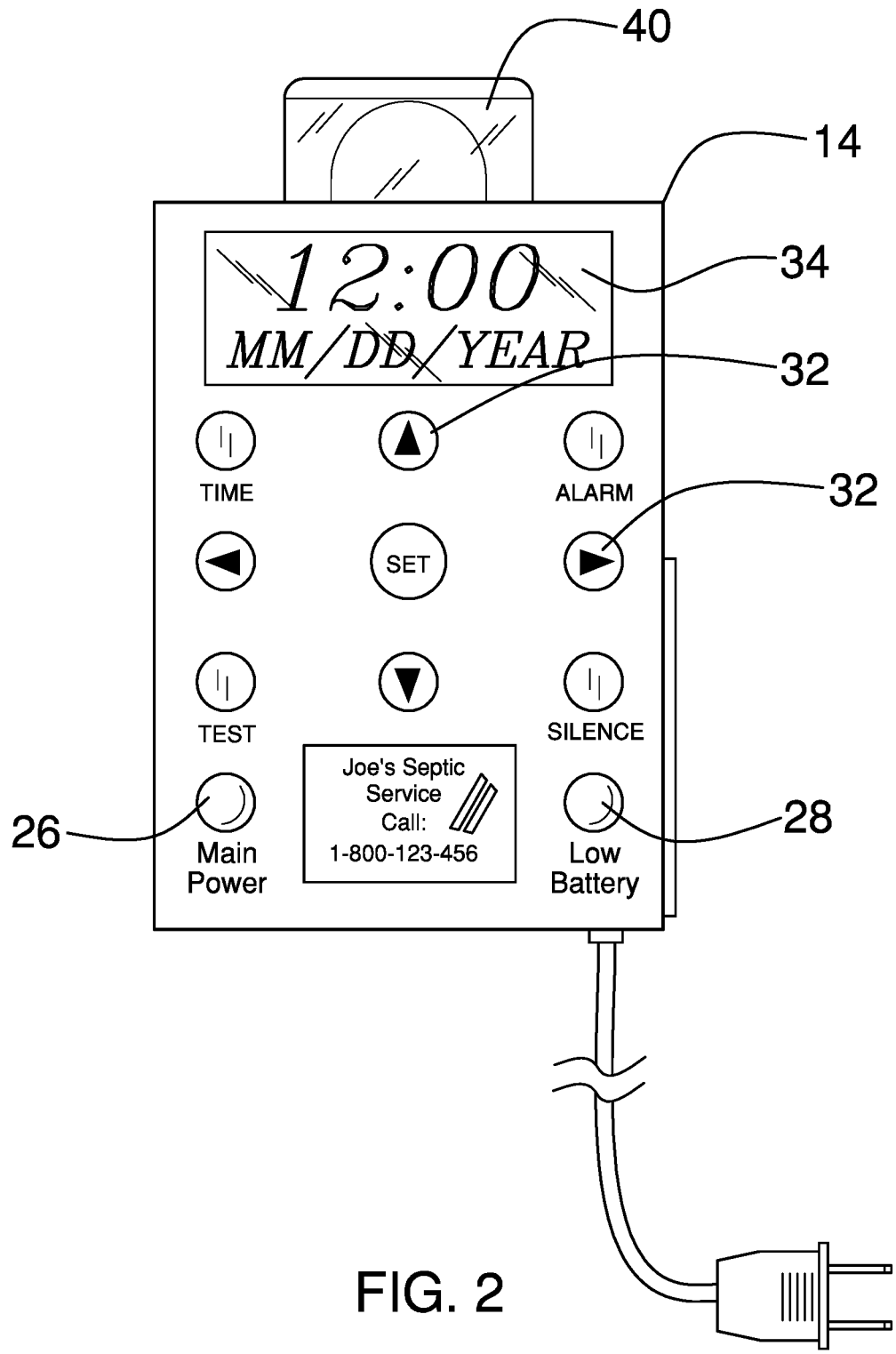
FIG. 2 is a front view of an embodiment of the disclosure.
Figure 3:
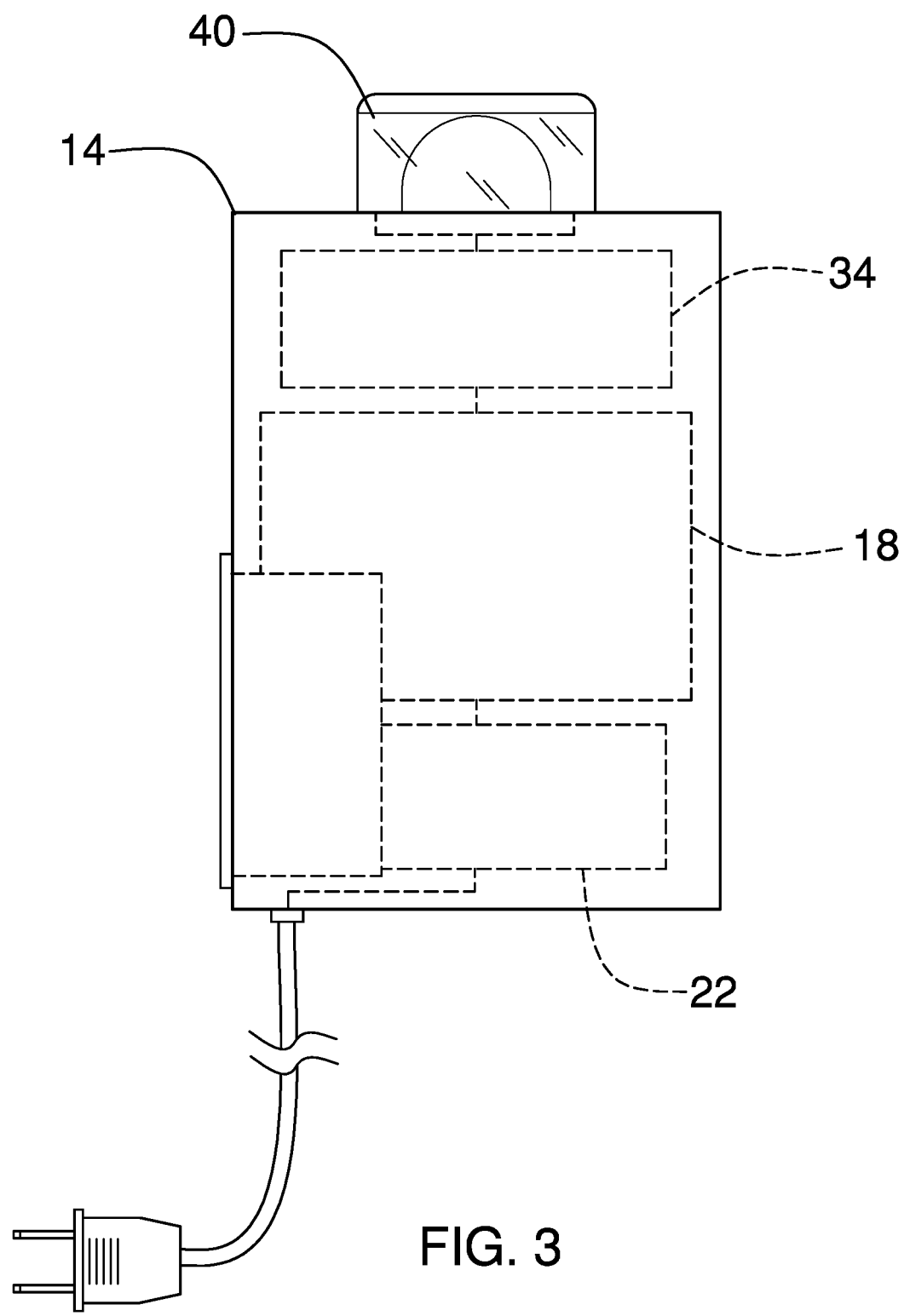
FIG. 3 is a side view of an embodiment of the disclosure.
Figure 4:
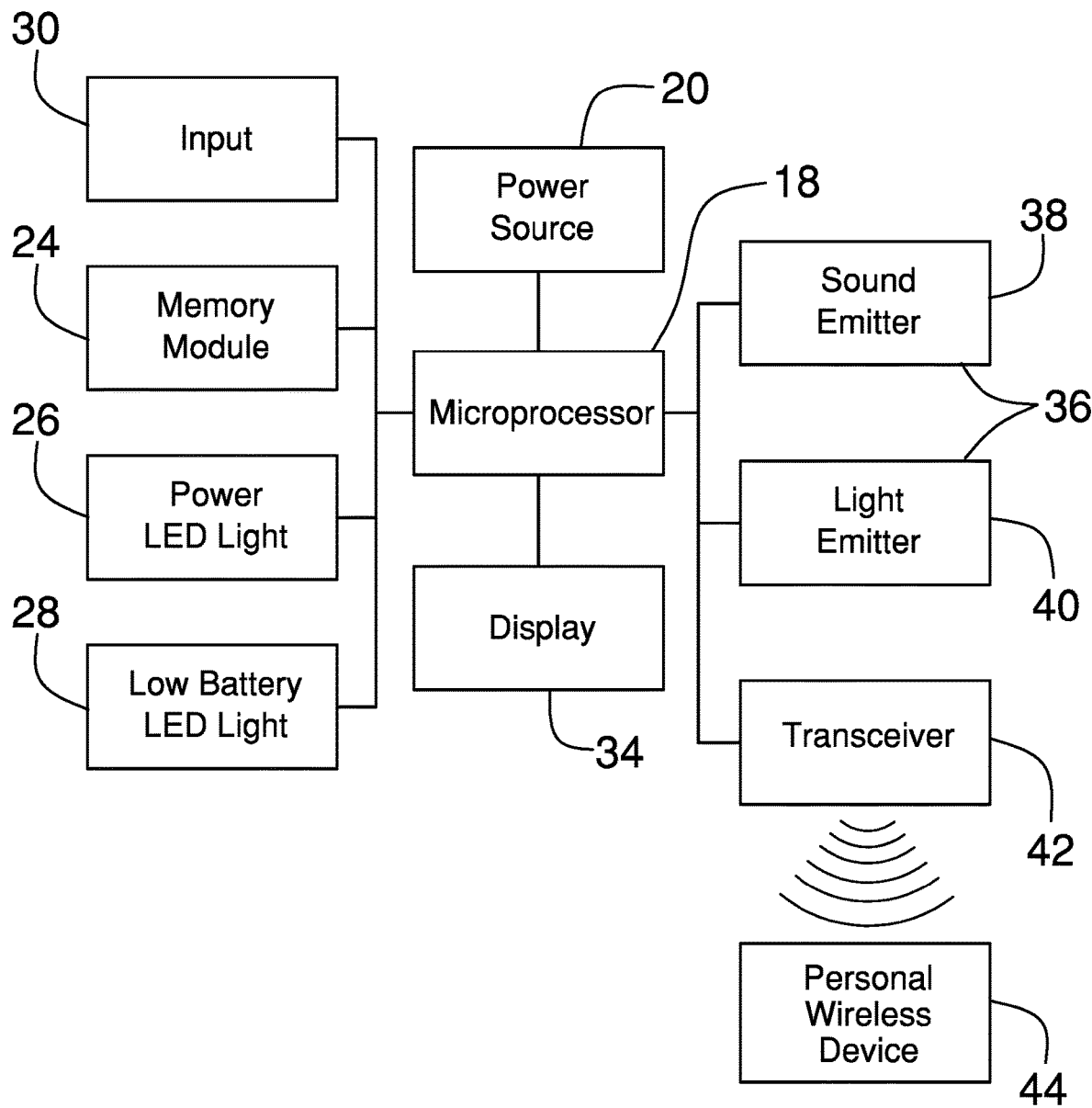
FIG. 4 is a schematic view of an embodiment of the disclosure.
Figure 5:
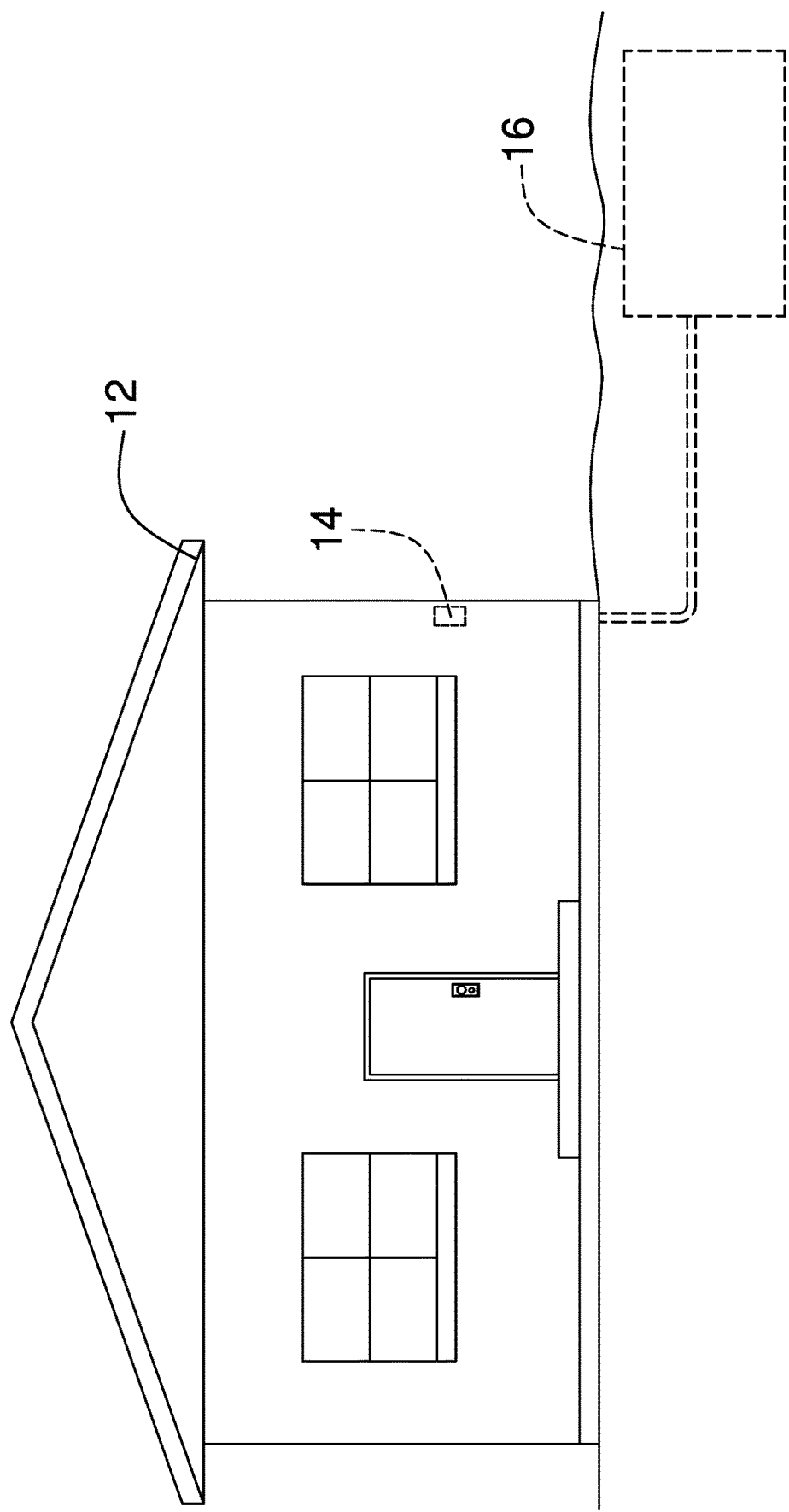
FIG. 5 is an in-use view of an embodiment of the disclosure.

With reference now to the drawings, and in particular to FIGS. 1 through 5 thereof, a new maintenance alerting device embodying the principles and concepts of an embodiment of the disclosure and generally designated by the reference numeral 10 will be described.

As best illustrated in FIGS. 1 through 5, the septic tank maintenance warning system 10 generally comprises a dwelling 12 in which a housing 14 is mounted in the dwelling 12. The dwelling 12 may be any dwelling which is used by person's who own a septic tank 16. Thus, the dwelling 12 may be a house, shed, garage or other similar structure. While the housing 14 will typically be positioned within the dwelling 12, it may also be mounted on an outside surface of the dwelling 12. A processor 18, or microprocessor, is mounted in the housing 14 and it is electrically coupled to a power source 20. The power source 20 may include a power outlet that is electrically coupled to the processor 18 by a conventional electrical plug and cord. A backup battery 22 may be mounted in the housing 14 to power the processor 18 should the power source 20 fail, though the battery 22 itself may comprise the power source 20. A memory module 24 is mounted in the housing 14 and is electrically coupled to the processor 18. Power 26 and lower battery 28 lights may also be mounted on the housing 14 and electrically coupled to the processor 18.

The processor 18 is programmed with a first time. The first time will typically comprise a current date and time of the user of the system 10. Thus, should the user install and initiate the system 10 on Oct. 10, 2020 at 2 pm UCT, that is the time and date which will be entered into the processor 18. The first time thereafter will be maintained by the processor 18 as a conventional clock or timer function such that it continuously matches the current time and date. The processor 18 is also programmed with a second time. The second time is a future date and time with respect to the first time and defines an alarm time. The embodiment of the system 10 will dictate what the second time can be reset to. For example, in one embodiment where the system 10 is used in an industrial complex, the second time may be between 5.0 hours and several days or weeks forward of the first time when the second time is reset. Though the system in this embodiment may still include a second time which is up to 10 years forward of the first time.

In another embodiment, where a septic tank 16 does not require such diligent maintenance, the second time will be resettable to a new second time only between 1.0 years and 10.0 years forward of the first time when the second time is reset. This time frame may be less such as between 1.0 years and 5.0 years, or 2.0 years to 4.0 years. That is, once the second time is attained, the processor 18 forces a second time having a date which is several hours to several years in the future to match the time required for a septic tank 16 maintenance pumping and inspection. For a typical septic tank 16 used with a person's home, that time is approximately 3.0 years and thus a second time of 2.0 years to 4.0 years may be preferred. However this may vary depending on the septic tank 16 and its usage. The processor 18 may receive an override input by a maintenance technician having the proper input, or a complete reset, should the second time reset require a date within a particular time of the current date, such as for example within two years of the current date.

An input 30 is mounted on the housing 14 and is electrically coupled to the processor 18. The input 30 is configured to allow input of the first and second times. The input 30 may include a keypad for selecting numerals or actuators 32 for scrolling through and selecting selectable inputs. Alternatively, the input 30 may include a touch screen to input selectable choices as required. A display 34 is mounted on the housing 14 and is electrically coupled to the processor 18. The display 34 is configured, for example, to display the first and second times. The display 34 may comprise an LED display screen and may further comprise a touch screen to function also as the input 30.

An alarm 36 is electrically coupled to the processor 18 and is activated when the second time is attained. The alarm 36 is used primarily to signal the owner/caretaker of the septic tank 16 that a maintenance technician is required to perform maintenance pumping and inspection on the septic tank 16. The alarm 36 may include a sound emitter 38 that is mounted on the housing 14 and is electrically coupled to the processor 18. The sound emitter 38 emits a sound when the second time is attained. Typically, the processor 18 will be programmed such that the input 30 is actuatable to turn off the sound emitter 38. However, for reasons described below, a separate signal may be required by the processor 18 to turn off the sound emitter 38.

The alarm 36 may additionally include a light emitter 40 that is mounted on the housing 14 and is electrically coupled to the processor 18. The light emitter 40 emits light when the second time is attained and may comprise a strobing or flashing emitted light. The light emitter 40 is turned off only when the processor 18 receives a reset code. The reset code may come from the input 30 wherein a particular sequence is required to entered into the system 10 to turn off the light emitter 40. The processor 18 may also require a particular sequence, or code, to turn off the sound emitter 38.

A transceiver 42 is mounted in the housing 14 and is electrically coupled to the processor 18. The transceiver 42 is configured to communicate with personal wireless devices 44. This may be accomplished in any number of conventional manners. Two such examples include long range cellular signal connections or short-range Bluetooth and/or WiFi signals. The short-range signals would typically allow communication between the processor 18 and a wireless internet router, whereupon the internet may be utilized to connect the system 10 with other devices including computers, cellular phones and the like. If the transceiver 42 utilizes cellular network communications, the system 10 may directly connect to cellular phones or again use the internet to connect to computers and cellular phones.

In particular, the personal wireless device 44 may comprise a cellular phone having a program application thereon which can communicate with the processor 18. In this way, the personal wireless device 44 may be utilized to send the reset code to the processor 18. Typically at least one function of the alarm 36 will continue to operate until the reset code is sent to the processor 18 to ensure that action is taken by a person, who sees/hears the alarm 36 and who is presumably the owner of the septic tank 16, to contact the maintenance engineer who has reset code for either wireless or direct input into the system 10. It should be understood that the processor 18 may also be used to send an alarm signal to the wireless devices 44 when the second time is attained. Thus, the owner and the maintenance engineer may simultaneously receive the alarm signal.

In use, the system 10 may be set up independently of any other septic tank warning system and is utilized, primarily, to ensure that maintenance pumping and inspections are performed before the septic tank 16 has a failure event or before the collection of too many solid materials. For this reason, the reset code is required which may be maintained in secret, or only be accessible by, the maintenance engineer to ensure that the owner of the septic tank 16 does not simply turn off the alarm 36 without scheduling the maintenance. After the septic tank 16 has been pumped and inspected, the maintenance inspector then resets the second time to the new second time, which may be, for example, about 3 years beyond the current date.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A septic tank monitoring system for tracking scheduled maintenance, the system including:
    a dwelling;
    a housing being mounted in the dwelling;
    a processor being mounted in the housing;
    the processor being programmed with a first time, the first time comprising a current date and time, the processor being programmed with a second time, the second time being a future date and time with respect to the first time, the second time defining an alarm time;
    the second time being resettable to a new second time only between 1.0 years and 10.0 years forward of the first time when the second time is reset; and
    an alarm being electrically coupled to the processor and being activated when the second time is attained, the alarm including a light emitter being mounted on the housing and being electrically coupled to the processor, the light emitter emits light when the second time is attained, the light being turned off only when the processor receives a reset code.

2. The septic tank monitoring system according to claim 1, further including an input being mounted on the housing and being electrically coupled to the processor, the input being configured to input the first and second times.

3. The septic tank monitoring system according to claim 1, further including a display being mounted on the housing and being electrically coupled to the processor, the display being configured to display the first and second times.

4. The septic tank monitoring system according to claim 1, wherein the alarm includes a sound emitter being mounted on the housing and being electrically coupled to the processor, wherein the sound emitter emits a sound when the second time is attained.

5. The septic tank monitoring system according to claim 4, further including an input being mounted on the housing and being electrically coupled to the processor, the input being configured to input the first and second times.

6. The septic tank monitoring system according to claim 5, wherein the input being actuatable to turn off the sound emitter.

7. The septic tank monitoring system according to claim 1, further including a transceiver being mounted in the housing and being electrically coupled to the processor, the transceiver being configured to communicate with personal wireless devices wherein the wireless devices can send the reset code to the processor.

8. The septic tank monitoring system according to claim 1, further including a transceiver being mounted in the housing and being electrically coupled to the processor, the transceiver being configured to communicate with personal wireless devices, the processor sending an alarm signal to the personal wireless devices when the second time is attained.

9. A septic tank monitoring system for tracking scheduled maintenance, the system including:
    a dwelling;
    a housing being mounted in the dwelling;
    a processor being mounted in the housing;
    the processor being programmed with a first time, the first time comprising a current date and time, the processor being programmed with a second time, the second time being a future date and time with respect to the first time, the second time defining an alarm time;
    the second time being resettable to a new second time only between 5.0 hours and 10.0 years forward of the first time when the second time is reset; and
    an alarm being electrically coupled to the processor and being activated when the second time is attained, the alarm being turned on when the second time is attained, the alarm being turned off only when the processor receives a reset code.

10. The septic tank monitoring system according to claim 9, further including an input being mounted on the housing and being electrically coupled to the processor, the input being configured to input the first and second times.

11. The septic tank monitoring system according to claim 9, further including a display being mounted on the housing and being electrically coupled to the processor, the display being configured to display the first and second times.

12. The septic tank monitoring system according to claim 9, wherein the alarm includes a sound emitter being mounted on the housing and being electrically coupled to the processor, wherein the sound emitter emits a sound when the second time is attained.

13. The septic tank monitoring system according to claim 12, further including an input being mounted on the housing and being electrically coupled to the processor, the input being configured to input the first and second times, the input being actuatable to turn off the sound emitter.

14. The septic tank monitoring system according to claim 9, further including a transceiver being mounted in the housing and being electrically coupled to the processor, the transceiver being configured to communicate with personal wireless devices wherein the wireless devices can send the reset code to the processor.

15. The septic tank monitoring system according to claim 9, further including a transceiver being mounted in the housing and being electrically coupled to the processor, the transceiver being configured to communicate with personal wireless devices, the processor sending an alarm signal to the personal wireless devices when the second time is attained, wherein the wireless devices can send the reset code to the processor.

16. The septic tank monitoring system according to claim 15, wherein the alarm includes a light emitter being mounted on the housing and being electrically coupled to the processor, the light emitter emits light when the second time is attained, the light being turned off only when the processor receives the reset code via the transmitter.

17. The septic tank monitoring system according to claim 16, wherein the light is turned off only when the processor receives the reset code via the transmitter.

18. The septic tank monitoring system according to claim 17, wherein the second time being resettable to a new second time only between 2.0 years and 4.0 years forward of the first time when the second time is reset.

19. The septic tank monitoring system according to claim 17, wherein the second time being resettable to a new second time only between 1.0 years and 10.0 years forward of the first time when the second time is reset.

20. A septic tank monitoring system for tracking scheduled maintenance, the system including:
- a dwelling;
- a housing being mounted in the dwelling;
- a processor being mounted in the housing;
- a memory module being mounted in the housing and being electrically coupled to the processor;
- the processor being programmed with a first time, the first time comprising a current date and time, the processor being programmed with a second time, the second time being a future date and time with respect to the first time, the second time defining an alarm time;
- the second time being resettable to a new second time only between 1.0 years and 10.0 years forward of the first time when the second time is reset;
- an input being mounted on the housing and being electrically coupled to the processor, the input being configured to input the first and second times;
- a display being mounted on the housing and being electrically coupled to the processor, the display being configured to display the first and second times;
- an alarm being electrically coupled to the processor and being activated when the second time is attained, the alarm including:
  - a sound emitter being mounted on the housing and being electrically coupled to the processor, the sound emitter emitting a sound when the second time is attained, the input being actuatable to turn off the sound emitter;
  - a light emitter being mounted on the housing and being electrically coupled to the processor, the light emitter emitting light when the second time is attained, the light being turned off only when the processor receives a reset code;
- a transceiver being mounted in the housing and being electrically coupled to the processor, the transceiver being configured to communicate with personal wireless devices wherein the personal wireless devices can send the reset code to the processor; and
- the processor sending an alarm signal to the wireless devices when the second time is attained.

\* \* \* \* \*